United States Patent
Ma

(10) Patent No.: US 8,891,647 B2
(45) Date of Patent: Nov. 18, 2014

(54) SYSTEM AND METHOD FOR USER SPECIFIC ANTENNA DOWN TILT IN WIRELESS CELLULAR NETWORKS

(75) Inventor: Zhengxiang Ma, Summit, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 882 days.

(21) Appl. No.: 12/915,525

(22) Filed: Oct. 29, 2010

(65) Prior Publication Data

US 2011/0103504 A1    May 5, 2011

Related U.S. Application Data

(60) Provisional application No. 61/256,663, filed on Oct. 30, 2009.

(51) Int. Cl.
*H04B 7/02* (2006.01)
*H04L 1/02* (2006.01)
*H04B 7/04* (2006.01)
*H04B 7/06* (2006.01)

(52) U.S. Cl.
CPC .............. *H04B 7/063* (2013.01); *H04B 7/0417* (2013.01); *H04B 7/0469* (2013.01); *H04B 7/0684* (2013.01)
USPC ........................................................ 375/267

(58) Field of Classification Search
USPC ................................... 375/267, 260; 455/444
See application file for complete search history.

(56) References Cited

U.S. PATENT DOCUMENTS

| | | | |
|---|---|---|---|
| 5,077,562 A * | 12/1991 | Chang et al. | 342/368 |
| 6,285,720 B1 * | 9/2001 | Martone | 375/262 |
| 7,236,808 B2 | 6/2007 | Goldberg | |
| 7,400,296 B2 | 7/2008 | Haskell | |
| 7,447,523 B2 | 11/2008 | Goldberg et al. | |
| 7,450,066 B2 | 11/2008 | Haskell | |
| 2007/0041466 A1 * | 2/2007 | Chiurtu et al. | 375/267 |
| 2008/0293451 A1 | 11/2008 | Haskell et al. | |
| 2008/0298482 A1 * | 12/2008 | Rensburg et al. | 375/260 |
| 2009/0058725 A1 | 3/2009 | Barker et al. | |
| 2009/0066595 A1 | 3/2009 | Barker et al. | |
| 2009/0075701 A1 | 3/2009 | Haskell et al. | |
| 2009/0135078 A1 * | 5/2009 | Lindmark et al. | 343/844 |

* cited by examiner

*Primary Examiner* — Chieh M Fan
*Assistant Examiner* — Wednel Cadeau
(74) *Attorney, Agent, or Firm* — Slater & Matsil, L.L.P.

(57) ABSTRACT

Systems and methods for user specific antenna down tilt in wireless cellular networks are disclosed. A preferred embodiment method comprises synthesizing a plurality of virtual antennas from a single physical antenna, wherein a total number of virtual antennas is less than a total number of antenna elements in the physical antenna, transmitting pilot signals on the plurality of virtual antennas, receiving, from a user equipment, a pre-coding control indicator based on the transmitted pilot signals, determining a multiple-input multiple output pre-coding vector based on the pre-coding control indicator, and transmitting user data modulated by the pre-coding vector to the user equipment via the plurality of virtual antennas.

22 Claims, 16 Drawing Sheets

320

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1234)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1234)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

SYSTEM AND METHOD FOR USER SPECIFIC ANTENNA DOWN TILT IN WIRELESS CELLULAR NETWORKS

This application claims the benefit of U.S. Provisional Application No. 61/256,663, filed on Oct. 30, 2009, entitled User Specific Antenna Down Tilt for Wireless Cellular Networks, which application is hereby incorporated herein by reference.

TECHNICAL FIELD

The present invention relates generally to systems and methods for wireless cellular networks, and more particularly to systems and methods for user specific antenna down tilt in wireless cellular networks.

BACKGROUND

Generally, wireless communications systems using beam forming utilize a number of transmit and/or receive antennas and signal processing to create fixed or adaptive transmit and/or receive beam patterns. The beam patterns may have a directional nature that results in a performance improvement when compared with unidirectional transmit and/or receive antennas. The use of beam patterns may yield a transmit/receive gain over wireless communications systems using unidirectional transmit and/or receive antennas. Beam forming therefore may help increase cell coverage and improve cell edge spectral efficiencies.

SUMMARY OF THE INVENTION

These and other problems are generally solved or circumvented, and technical advantages are generally achieved, by preferred embodiments of the present invention which provide user specific antenna down tilt for wireless cellular networks.

In accordance with an embodiment of the present invention, a method for user-specific antenna down tilt comprises generating, with a first physical antenna, a first antenna beam A having a first down tilt angle, generating, with the first physical antenna, a second antenna beam B having a second down tilt angle different from the first down tilt angle, synthesizing a first virtual antenna from the first and second beams, synthesizing a second virtual antenna from the first and second beams, transmitting a first pilot signal via the first virtual antenna, transmitting a second pilot signal via the second virtual antenna, receiving, from a user equipment, information indicative of a phase difference between the first and second virtual antennas, determining a multiple-input multiple output pre-coding vector based on the information received from the user equipment, and transmitting user data modulated by the pre-coding vector to the user equipment via the first and second virtual antennas.

In accordance with an embodiment of the present invention, a method for user-specific antenna down tilt comprises synthesizing a plurality of virtual antennas from a single physical antenna, wherein a total number of virtual antennas is less than a total number of antenna elements in the physical antenna, transmitting pilot signals on the plurality of virtual antennas, receiving, from a user equipment, a pre-coding control indicator based on the transmitted pilot signals, determining a multiple-input multiple output pre-coding vector based on the pre-coding control indicator, and transmitting user data modulated by the pre-coding vector to the user equipment via the plurality of virtual antennas.

In accordance with another embodiment of the present invention, an active antenna system comprises a physical antenna having a vertical column of more than two antenna elements and configured to radiate pilot signals from first and second virtual antennas, a wideband radio unit comprising at least two transmission and reception units coupled to the physical antenna, and a baseband unit coupled to the wideband radio unit, the baseband unit configured to synthesize the first and second virtual antennas, receive an indication of a phase difference between the first and second virtual antennas specific to a user equipment, determine a multiple-input multiple output pre-coding vector based on the phase difference; and modulate user data with the pre-coding vector for transmission to the user equipment via the first and second virtual antennas.

In accordance with another embodiment of the present invention, an antenna system comprises a physical antenna having a vertical column of more than two antenna elements and configured to radiate pilot signals from first and second virtual antennas, a wideband radio unit having two transmission and reception units coupled to the antenna, a feeder distribution network disposed between the wideband radio unit and the physical antenna, and coupling each of the transmission and reception units to the antenna elements, the feeder distribution network configured to synthesize the first and second virtual antennas, and a baseband unit coupled to the wideband radio unit, and configured to receive an indication of a phase difference between the first and second virtual antennas specific to a user equipment (UE), determine a multiple-input multiple output pre-coding vector based on the phase difference; and modulate user data with the pre-coding vector for transmission to the UE via the first and second virtual antennas.

BRIEF DESCRIPTION OF THE DRAWINGS

For a more complete understanding of the present invention, and the advantages thereof, reference is now made to the following descriptions taken in conjunction with the accompanying drawing, in which:

FIG. 11 is a table showing a codebook for four antenna ports;

FIG. 12 is a table showing antenna codebook matrices for four antenna ports;

DETAILED DESCRIPTION OF ILLUSTRATIVE EMBODIMENTS

Figure 1:
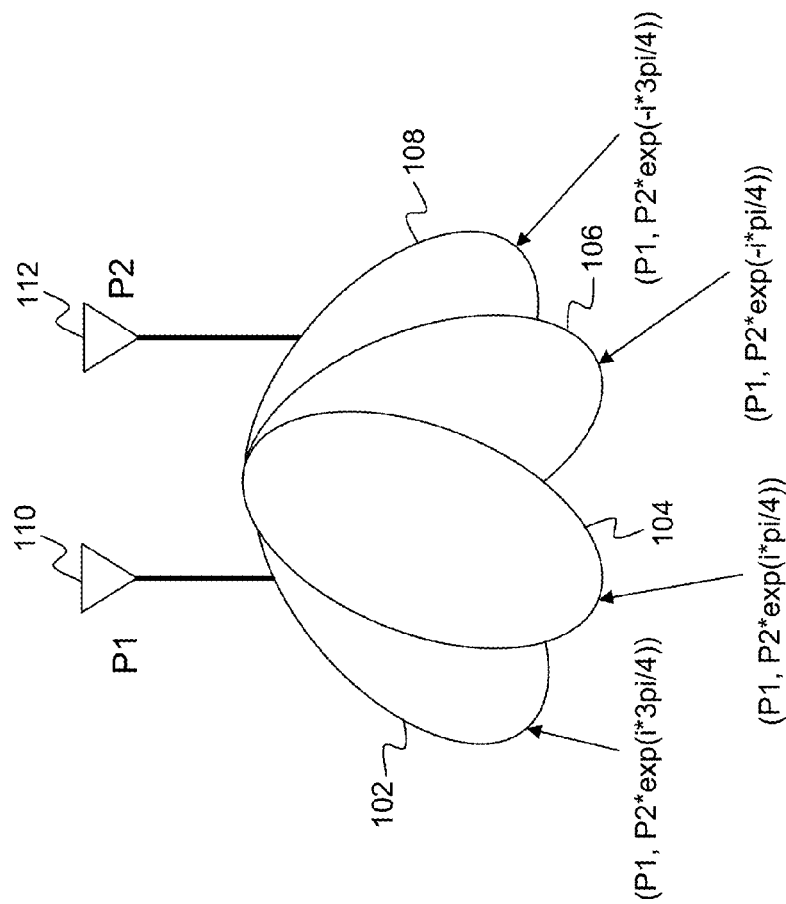
FIG. 1 is a planar view of horizontal beams formed by two antennas.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in specific contexts, such as Third Generation Partnership Project (3GPP) Long Term Evolution (LTE) and wideband code division multiple access (WCDMA) high-speed packet access (HSPA) wireless cellular networks. The invention also may be applied, however, to other wireless communications systems, such as 3GPP LTE-Advanced and Worldwide Interoperability for Microwave Access (WiMAX), as well as other wireless communications systems.

In such wireless communication systems, a base station transceiver (BTS) may be commonly referred to as a base station (BS), access point (AP), access network (AN), and so forth, while a user equipment (UE) may be commonly referred to as a mobile station (MS), access terminal (AT), subscriber, subscriber station, terminal, and so on.

In a wireless cellular network, vertical beam forming may be used to provide base station antenna down tilt. Generally, vertical beam forming allows the generation of antenna beams having different main-lobe pointing angles in the vertical plane. Generally, antenna down tilt assists in controlling the coverage of a base station and the interference between neighboring base stations. Increasing the down tilt of the base station antenna generally reduces the coverage footprint of the cell as well as interference to and from neighboring cells. The capacity/throughput of a cell for data services may be to a large extent determined by the level of interference between the users within the cell (intra-cell interference) and from neighboring cells (inter-cell interference).

Vertical beam forming may be used to provide user-specific down tilt for a cellular network base station antenna, but currently there is no known demonstrated practical user-specific down tilt implementation. By tailoring the down tilt angle of a high power data signal for a particular UE, the UE may receive a stronger signal from the BTS. In addition, the interference to other users in the cell or in the neighboring cells may be reduced, enhancing the overall signal to interference ratio for the users, and therefore enhancing the throughput and capacity of the system. The effect may be especially pronounced for UEs at the cell edges, because they suffer more severely from interference from neighboring cells.

In an active antenna system, however, a large number of active elements (e.g., greater than eight or ten) may be used in the vertical dimension to produce a narrow beam width. User level beam forming in this situation generally has significant digital signal processing cost due to the large number of active elements. The amount of reference/pilot signal processing involved is large because each element is treated as an independent antenna during beam forming. Baseband digital signal processing per user increases with the number of independent signals that are processed for each user. With the large number of antenna elements, simply beam forming by treating each element as an independent antenna generally involves a large amount of baseband signal processing and overhead resource in terms of processing the reference/pilot signals. In addition, vertical beam forming may require significant modification of air-interface standards, making it difficult to implement in existing networks.

In accordance with an embodiment of the present invention, user specific antenna down tilt in a wireless cellular network is implemented by synthesizing a small number of virtual antennas using a vertical stack of multiple radiating antenna elements. On the downlink (DL) from the BTS, each virtual antenna uses a different reference or pilot signal to enable the UE to sense and report information related to its optimal down tilt angle. The BTS uses this information to form an antenna beam with optimized down tilt angle for communicating with the specific UE. The UE may coherently demodulate both the non-beam-formed and beam-formed signals from the BTS. On the uplink (UL), the virtual antennas may be used to form user specific beams through antenna combination techniques such as maximum ratio combining (MRC) and interference rejection combining (IRC).

An embodiment of the invention leverages existing multiple-input/multiple-output (MIMO) standards and applies them in the vertical dimension using an adaptive antenna system (AAS) approach instead of an approach that employs multiple independent MIMO antennas. User specific antenna down tilt may be implemented with pre-coding beam-forming as supported by the 3G/4G standard air-interface. Both wideband code division multiple access (WCDMA) high-speed packet access (HSPA) and Third Generation Partnership Project (3GPP) long term evolution (LTE) standards have special provision to support beam forming as a special mode of MIMO. In HSPA, the downlink beam forming is supported using pre-coding. In LTE, the downlink beam forming can be supported either using pre-coding, or arbitrary beam forming with a user specific reference signal. Uplink beam forming may depend on the proprietary receiver implementations of vendors. Of course, modification of the standards may provide further enhancements and benefits for embodiments of the present invention.

In contrast to physically independent MIMO antennas, or to treating each element of an antenna as a separate antenna, an embodiment of the present invention realizes a small number of virtual antennas on a single physical antenna. Further, in some embodiments, a virtual antenna beam is synthesized in digital baseband rather than in the analog RF portion of a system. The synthesis may leverage existing MIMO standard support in the digital baseband.

An embodiment of the invention significantly reduces computational complexity by synthesizing a smaller number of virtual antennas from a vertical array containing a larger number of antenna elements. The virtual antennas are synthesized with desired amplitude and phase characteristics in their radiation patterns. The beam forming MIMO techniques built into the 3G/4G wireless cellular air-interfaces can be used to form user specific beams in the vertical direction, or user specific down tilt, thus significantly reducing signal processing complexity and digital hardware requirements.

An embodiment of the invention may provide increased capacity through interference reduction. Specifically, as the tilt angle for users closer to the base station is increased, the base station's downlink signal interference to edge users or users in adjacent cells is reduced accordingly. The base station uplink signal also encounters less interference from users farther away from the base station. Optimizing tilt for a user also generally enhances path gain between the user and the base station, thus increasing the uplink and downlink signal quality.

An embodiment of the invention may provide system cost reduction based on reduced baseband digital signal processing requirements. Because there are fewer virtual antennas than individual antenna elements, there are fewer independent radio-frequency (RF) signals to be processed in the baseband as compared to a full blown element-by-element beam forming approach.

An illustration of horizontal beam forming is shown in FIG. 1. In this Figure, four horizontal beams 102, 104, 106 and 108 are formed by two antennas 110, 112 as supported by MIMO standards. The two antennas 110, 112 transmit two separate pilot signals P1 and P2. A mobile unit measures the two pilot signals and reports back the pre-coding control indicator (PCI). The transmit data for the mobile unit is then modulated on the two antennas using a pre-coding vector. The mobile unit is informed of the pre-coding vector and uses this information to demodulate the signal. Different pre-coding vectors are used depending on the position of the mobile unit. The pre-coding vectors for the different beams are as follows:

Beam 102: $(1, (-1-i)/\mathrm{sqrt}(2))$
Beam 104: $(1, (-1+i)/\mathrm{sqrt}(2))$
Beam 106: $(1, (1-i)/\mathrm{sqrt}(2))$
Beam 108: $(1, (1+i)/\mathrm{sqrt}(2))$ In horizontal beam forming, the two antennas have effectively the same coverage footprint. Mobile units at different horizontal locations sense a different phase between the two received pilot signals due to the horizontal separation of the two transmit antennas. The mobile units use the two pilot signals to coherently demodulate the beam formed signal. Demodulation by a mobile unit of common channels transmitted from a single antenna is not adversely affected by beam forming.

Figure 2A:
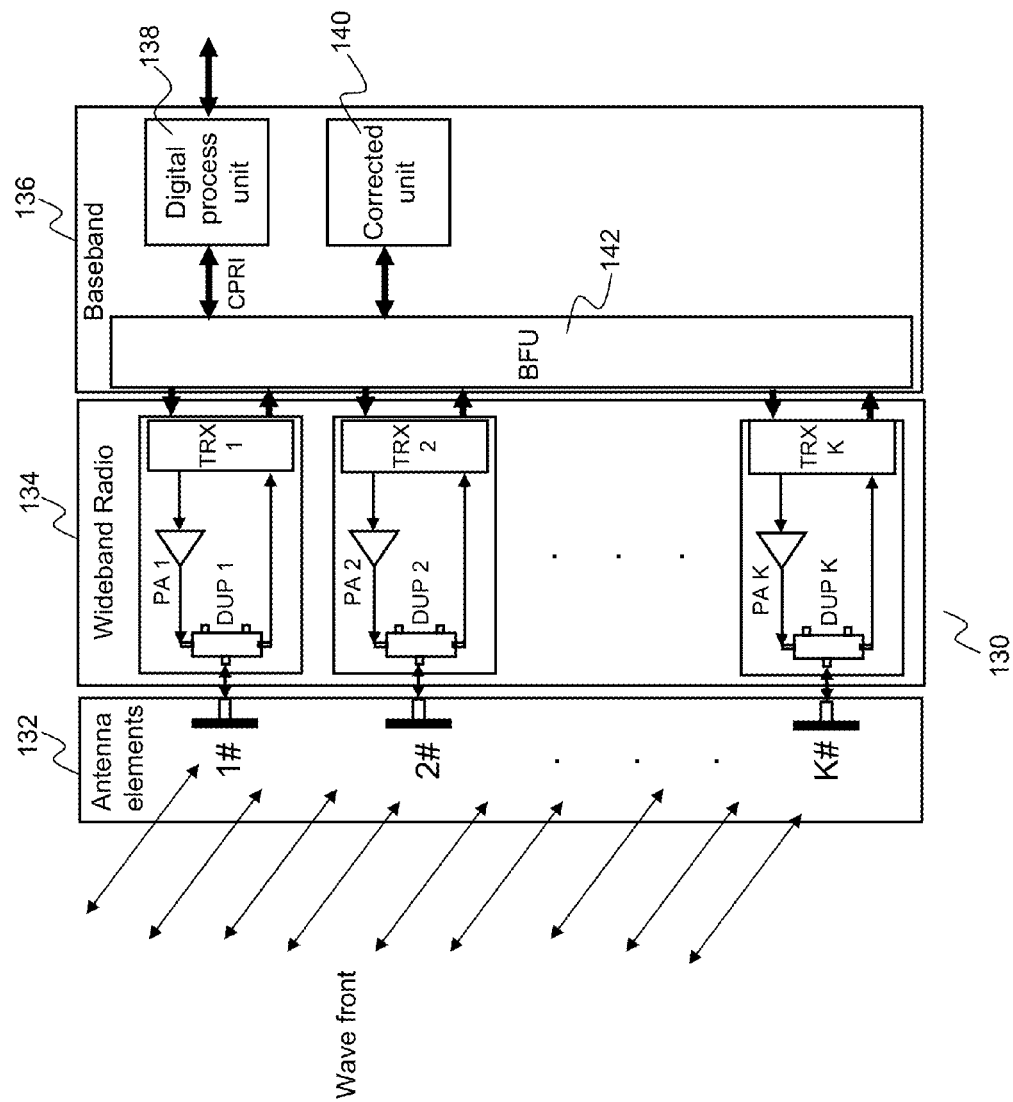
FIGS. 2A and 2B are block diagrams of active antenna systems.

FIG. 2A is a block diagram illustrating a single column active antenna system that can be used for vertical beam forming. AAS 130 has an antenna 132 with a vertical column of antenna elements 1# through K# for transmitting signals to and receiving signals from mobiles. K is generally a high value, such as 8, 10, 12 or more, and double those numbers if cross-polarization is used. Each antenna element is driven with RF energy by a respective transmission and reception unit (TRX) TRX 1 through TRX K in wideband radio unit 134. Transmit signals from TRX 1-TRX K are amplified by power amplifiers PA 1 through PA K, respectively. The transmit and receive signals are duplexed in duplexers DUP 1 through DUP K.

Beam forming is performed in the digital domain in baseband unit (BBU) 136. Digital processing unit 138 and corrected unit 140 interface to beam forming unit (BFU) 142 via a Common Public Radio Interface (CPRI). The CPRI link permits the radio equipment control (REC) on one side of the link to be co-located with or remotely located from the radio equipment (RE) on the other side of the link. In the baseband unit 136, the vertical down tilt angle of the antenna beam can be adjusted in the digital domain. The uplink and downlink signals can be beam formed independently, and multiple beams can be formed simultaneously. Beam forming unit 142 can adjust amplitude and phase per radio access technology (RAT) or carrier.

Figure 2B:
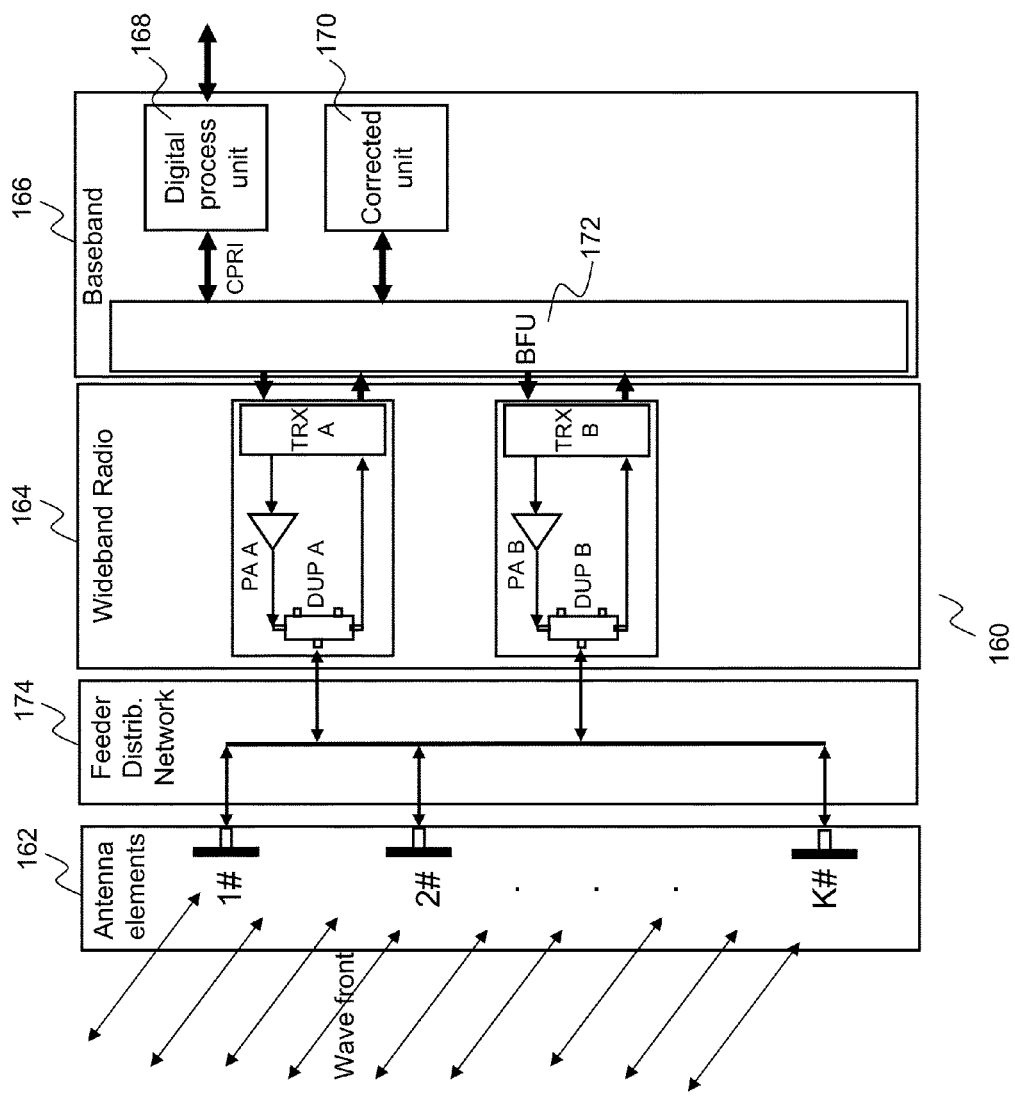

FIG. 2B is a block diagram illustrating another single column active antenna system that can be used for vertical beam forming. AAS 160 has an antenna 162 with a vertical column of antenna elements 1# through K# for transmitting signals to and receiving signals from mobiles. K is generally a high value, such as 8 or 10, and double those numbers if cross-polarization is used. The antenna elements are driven with RF energy by two transmission and reception units TRX A and TRX B in wideband radio unit 164. Transmit signals from TRX A and TRX B are amplified by power amplifiers PA A and PA B, respectively. The transmit and receive signals are duplexed in duplexers DUP A and DUP B. In BBU 166, digital processing unit 138 and corrected unit 140 interface to BFU 142 via a CPRI link.

In this system, beam forming is partially performed in the analog domain in feeder distribution network 174 disposed between the antenna elements 162 and wideband radio unit 164. Further details of a distribution network may be found in U.S. Pat. No. 7,450,066, issued to Haskell on Nov. 11, 2008, which patent is hereby incorporated herein by reference. Distribution network 174 couples the two transmit and reception units to the antenna elements 1# through K#, and the vertical down tilt angle of the antenna beam can be adjusted in the analog domain. With this antenna 162, feeder distribution network 174 and wideband radio network 164 configuration, the synthesis of virtual antennas can be performed within the active antenna utilizing a beam associated with each of the transmit and reception units, as described in more detail hereinbelow. Because the virtual antennas are synthesized in the analog domain, BBU 166 may function as a standard BBU instead of synthesizing the virtual antennas in the digital domain. The uplink and downlink signals can be beam formed independently in the digital domain, and multiple beams can be formed simultaneously.

Figure 3:
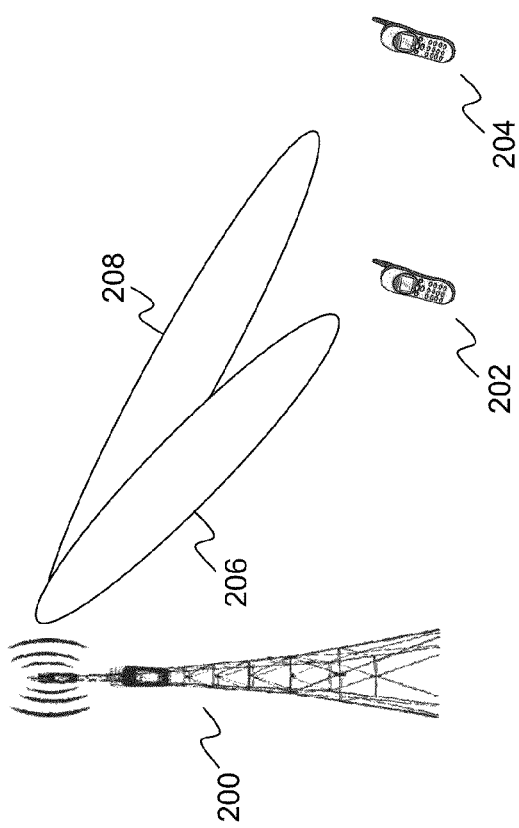
FIG. 3 is a side view of beams formed in the vertical plane.

FIG. 3 illustrates a side view of user-specific beams formed in the vertical plane. BTS 200 utilizes beam forming to change the down tilt of a beam based on the elevation angle of a specific user relative to the BTS single column antenna elements. In this example, mobile unit 202 is located at a lower angle to the BTS antenna than mobile unit 204. BTS 200 utilizes beam forming techniques to form beam 206 with a down tilt directed to mobile unit 202's location, and to form beam 208 with a down tilt directed to mobile unit 204's location. By forming a narrower beam with down tilt tailored to the location of an individual user, the required radiated power per user may be reduced. Furthermore, the interference to other users, especially to users in other cells may be significantly decreased. For HSPA and LTE, simulation results of 20% overall cell throughput and 60% edge user throughput, or more, may be achievable.

Figure 4:
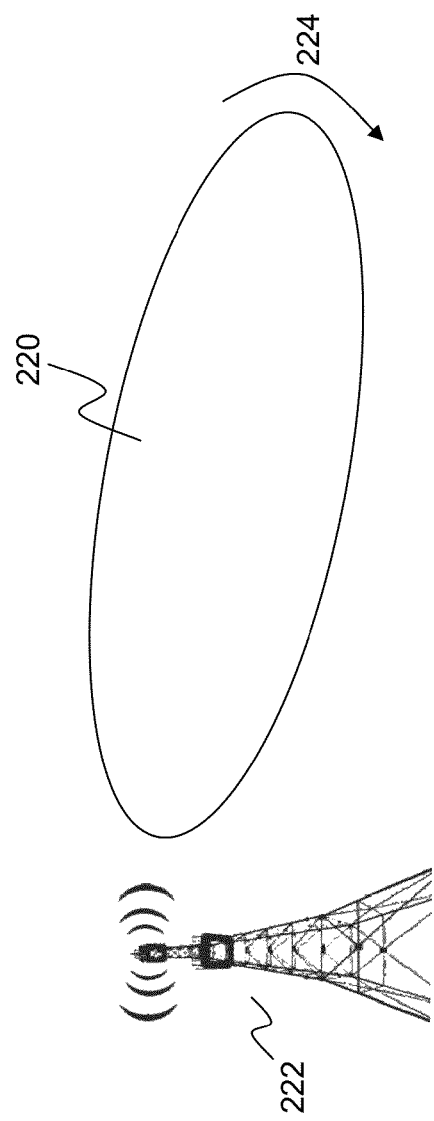
FIG. 4 is a side view of a virtual antenna beam pattern.

FIG. 4 is a side view of a virtual antenna beam pattern 220 generated by base station 222 and used to implement user-specific antenna down tilt. Base station 222 synthesizes a small number of virtual antennas (e.g., 2 or 4, or 2 per polarization) with specific beam characteristics using a vertical stack of multiple radiating elements. The same beam amplitude pattern 220 is used for each virtual antenna. The relative phase difference between the virtual antennas changes monotonically and depends on the tilt elevation angle 224.

The BTS uses this information to form an antenna beam with optimized down tilt angle for communicating with the specific UE. Each of the two virtual antennas radiates its own unique reference or pilot signal. A mobile measures the phase difference between the two pilot signals and reports this information back to the base station. The base station can use pre-coding to form a traffic beam for the mobile based on mobile measurement feedback. Based on the measured phase difference, the formed beam effectively has a tilt angle optimized for the mobile. Thus, instead of two separate antennas, two virtual antennas are synthesized from the same antenna element array. Again, the two virtual antennas have the same coverage, i.e., beam pattern, but have different relative phases.

In order for the mobile to provide feedback for the BTS to determine the appropriate down tilt angle based on the same pre-coding beam-forming mechanism built into the standards, the two virtual antennas are synthesized with the appropriate relative phase characteristics for users at different down tilt angles. The pre-coding of the user data on the two virtual antennas then automatically forms a beam with down tilt angle tailored to the user.

By using a small number of virtual antennas, embodiments of the invention significantly reduce the number of independent signals used to implement user-specific beam forming in the vertical dimension, thereby significantly reducing the amount of baseband digital signal processing required to process the signals.

Figure 5:
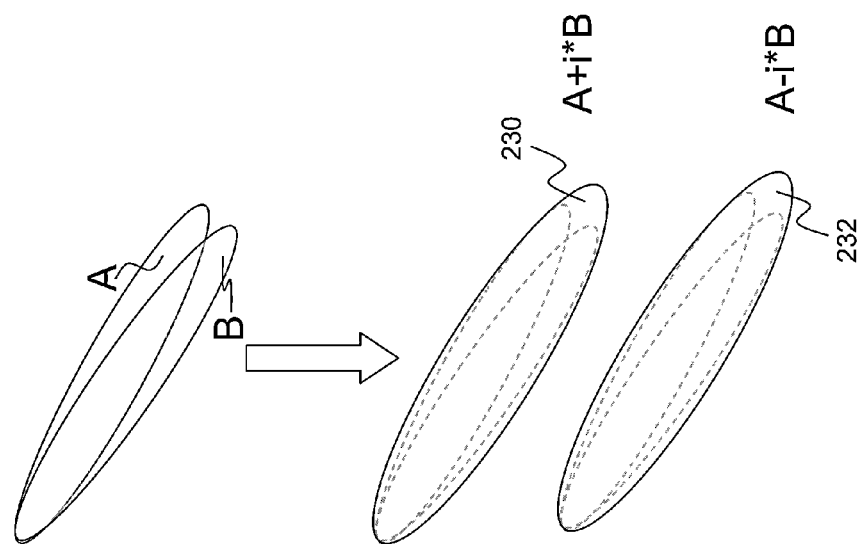
FIG. 5 is a diagram illustrating virtual antenna synthesis.

FIG. 5 illustrates an example of virtual antenna synthesis, in which two virtual antenna patterns are synthesized to have the desired relative phase characteristics with respect to each other. Two antenna beams A and B with two different down tilt angles are generated by the same physical antenna in a base station. A first virtual antenna 230 is synthesized from beams A and B based on the complex number formula A+i*B. A second virtual antenna 232 is synthesized from beams A and B based on A+i*B. Beams A and B may be formed in the digital domain in the baseband unit, or they may be formed in the analog domain in the wideband radio unit and feeder distribution network.

Pilot signals are transmitted to a mobile on the two virtual antennas 230, 232. At an angle where beam A dominates, the phase difference between the two virtual antennas as seen by a mobile monitoring the two pilot signals from the virtual antennas is 0. At an angle where beams A and B are equal, the phase difference between the two virtual antennas is p/2. At an angle where beam B dominates, the phase difference between the two virtual antennas is p.

Figure 6:
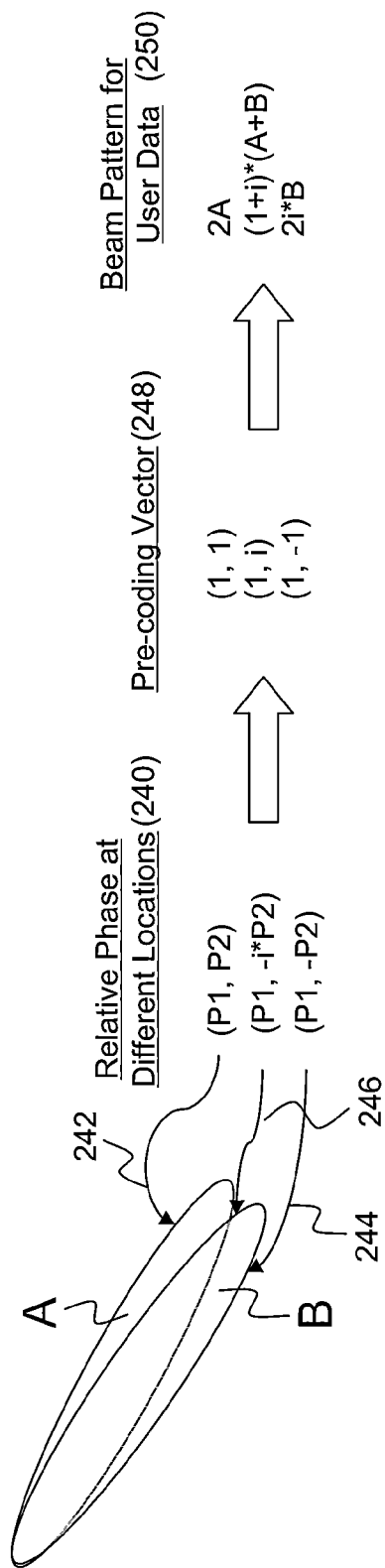
FIG. 6 is a diagram illustrating beam forming using two virtual antennas.

FIG. 6 illustrates further details of beam forming in the vertical plane using two virtual antennas. Two virtual antennas synthesized from antenna beams A and B transmit two separate pilot signals from the base station. The mobile measures the two pilot signals to determine the phase difference between the signals. The relative pilot phase measured by the mobile will be different depending on the mobile's physical location, or vertical tilt angle, with respect to the base station antenna. At angle 242 where beam A dominates, the mobile measures a relative pilot phase difference of 0 (P1, P2). At angle 244 where beams A and B are equal, the mobile measures a relative pilot phase difference of $\pi/2$ (P1, $-i$*P2). At angle 246 where beam B dominates, the mobile measures a relative pilot phase difference of $\pi$ (P1, $-$P2). Based on the measured relative pilot signal phase difference, the mobile reports the PCI back to the base station.

The transmit data for the mobile is then modulated on the two antennas using the corresponding pre-coding vector 248. Based on the three different down tilt angles discussed above, the corresponding pre-coding vector for angle 242 (P1, P2) is (1, 1), the corresponding pre-coding vector for angle 244 (P1, $-i$*P2) is (1, i); and the corresponding pre-coding vector for angle 246 (P1, $-$P2) is (1, $-1$). The resulting beam patterns 250 for the user data for the three different down tilt angles are 2A for angle 242, (1+i)*(A+B) for angle 244, and 2i*B for angle 246. The mobile is informed of the pre-coding vector and uses this information to demodulate the signal received from the base station.

Figure 7:
FIG. 7 is a table showing a codebook for two antenna ports.

FIG. 7 illustrates the LTE codebook 254 for two antenna ports. Codes 0, 1 and 2 for 1-layer transmission are illustrated in FIG. 6. In a non-scattering environment, coding vector (1, $-i$) for code 3 is not used in this beam synthesis example. In a rich scattering environment, however, all the code indexes 0, 1, 2 and 3 for 1-layer and 2-layer transmission may be utilized. Thus, user-specific down tilt is accomplished by leveraging the pre-coding beam forming supported by MIMO standards. Generally, non-standard modification of the base station BBU is not necessary, thus avoiding significant new development in the AAS BFU.

Figure 8B:
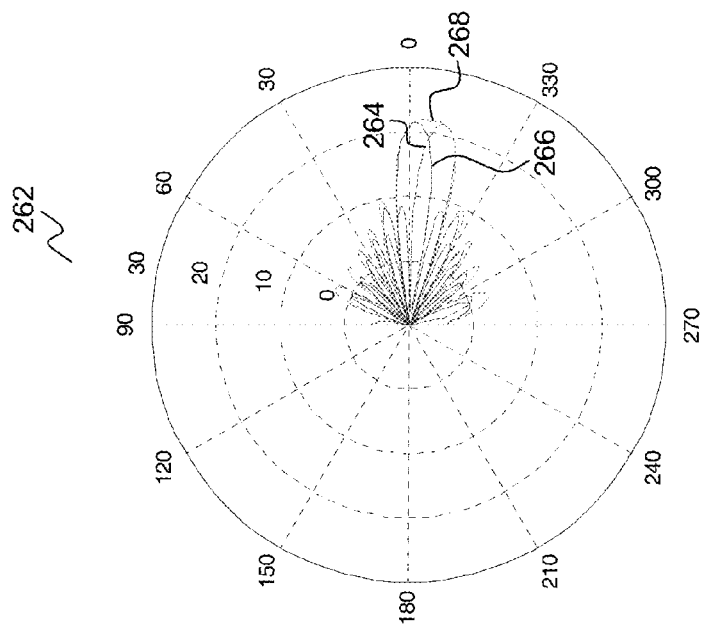
FIGS. 8A and 8B are graphs showing gain over elevation for an illustrative virtual antenna design.
Figure 8A:
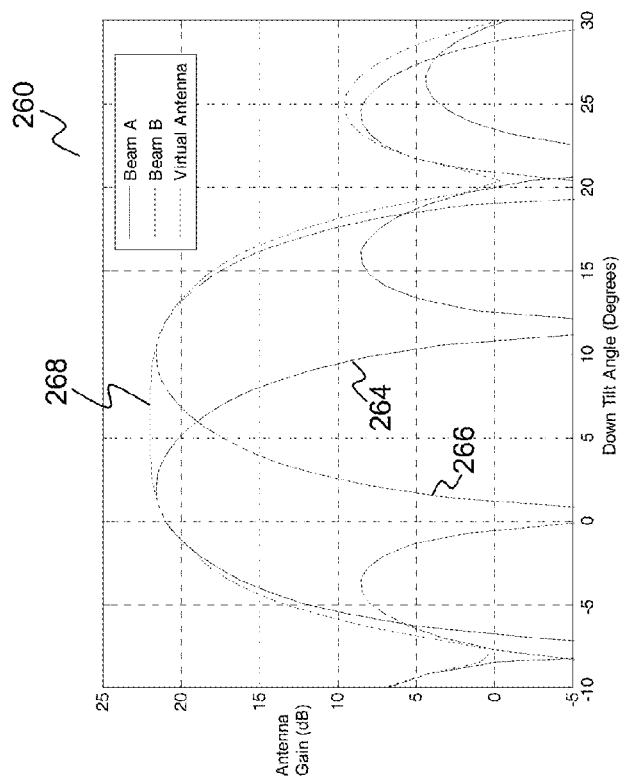

FIGS. 8A and 8B illustrate a Cartesian coordinate graph 260 and a polar graph 262, respectively, showing gain for an example virtual antenna design. An antenna has a 12-element uniform array spaced by $\lambda/2$. Beam A 264 is down-tilted by 2°, and Beam B 266 is down-tilted by 10°. Both beams have a 3 dB bandwidth of about 9°.

In general, the current distribution of each beam on the antenna elements is given by:

D*exp(i*pi*sin(x°*(N$-$(M+1)/2)), where D is a constant, x is the down-tilt angle, M is the number of elements, and N=1, 2, ..., M.

For this example, the current distribution of Beam A 264 on the antenna elements is given by:

D*exp(i*pi*sin(2°*(N$-$6.5))), where D is a constant, and N=1, 2, ..., 12.

The current distribution of Beam B 266 on the antenna elements is given by:

D*exp(i*pi*sin(10°*(N$-$6.5))), where D is a constant, and N=1, 2, ..., 12.

The virtual antenna 268 has a beam width of about 16°. Of course, this is only an example design. In accordance with embodiments of the invention, other variations of synthesis methods can be employed to achieve the desired phase characteristics for the virtual antenna beam. For example, the virtual antenna can be formed by A+(1+$\delta$)*exp(i*$\theta$)*B and (A+(1+$\delta$)*exp($-i$*$\theta$)*B)*exp($-i$*$\phi$), where $\delta$, $\theta$ and $\phi$ are tunable parameters. In the previous example, $\delta$=0, $\theta$=$\pi/2$, and $\phi$=$\pi/4$.

Figure 9:
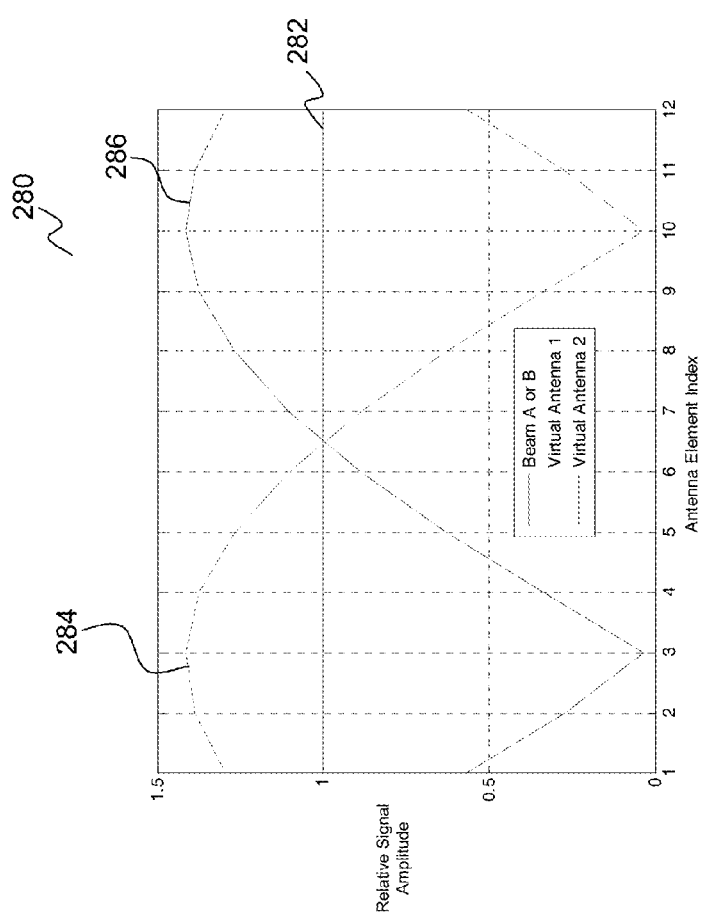
FIG. 9 is a graph showing relative signal amplitude of the illustrative virtual antennas along the antenna elements.

FIG. 9 illustrates graph 280 showing relative signal amplitude of virtual antennas along the antenna elements. In this example, Beam A or B signal distribution 282 is equal between the antenna elements, and is normalized to a value of one. Virtual antenna 1 signal distribution 284 and virtual antenna 2 signal distribution 286, however, are not uniform. Each has a peak, and the peaks for virtual antenna 1 and virtual antenna 2 are located away from each other. Effectively, the two virtual antennas have separation in the vertical direction. The two virtual antennas therefore produce a changing phase difference at the mobile as the mobile moves in tilt angle relative to the base station antenna.

Figures 10A, 10B:
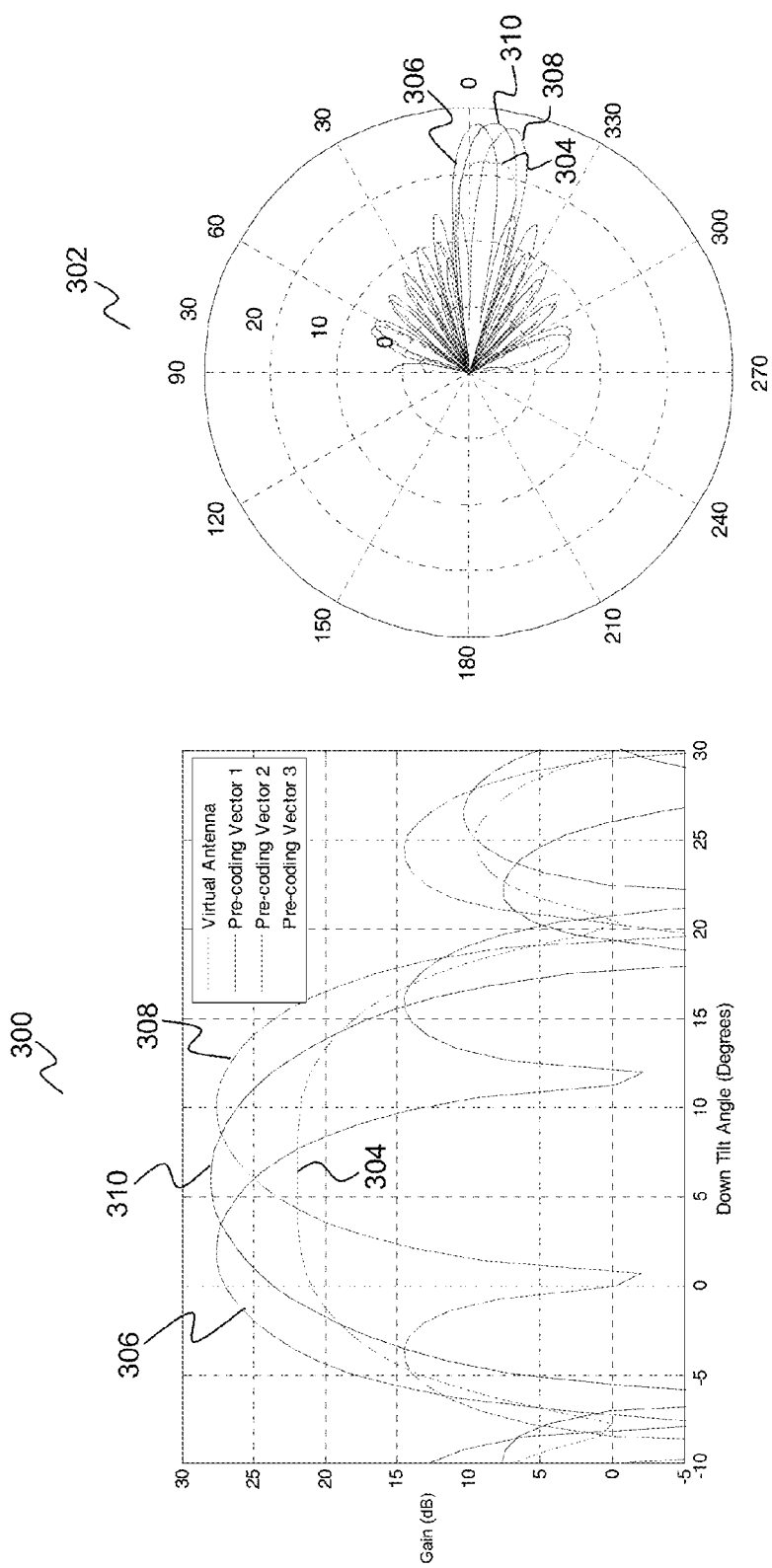
FIGS. 10A and 10B are graphs showing gain over elevation of beams with different down tilt angles.

FIGS. 10A and 10B illustrate a Cartesian coordinate graph 300 and a polar graph 302, respectively, showing gain of beams with different down tilt angles. The virtual antenna 304 has a beam width of about 16°, and is the same as that shown in FIGS. 8A and 8B. The three pre-coding vectors described hereinabove produce three user data beams with different down-tilt angles. User data beam 306 has a down tilt angle of 2°, user data beam 310 has a down tilt angle of 6°, and user data beam 308 has a down tilt angle of 10°. User data beam 306 has a 3 dB beam width of 9°, user data beam 310 has a 3 dB beam width of 11°, and user data beam 308 has a 3 dB beam width of 9°.

Embodiments also may be implemented in four virtual antenna scenarios, again using pre-coding beam forming supported by MIMO standards. A typical base station deployment uses a single vertical column antenna with elements having cross polarization. By synthesizing two virtual antennas in the vertical plane for each polarization, an antenna with cross polarization effectively can support four antenna ports. FIG. 11 illustrates table 320 containing the four antenna port codebook for the LTE standard. In table 320, the quantity $W_n^{\{s\}}$ denotes the matrix defined by the columns given by the set {s} from the expression $W_n = I - 2u_n u_n^H / u_n^H u_n$ where I is the identity matrix and the vector $u_n$ is defined in FIG. 11.

Figure 12:
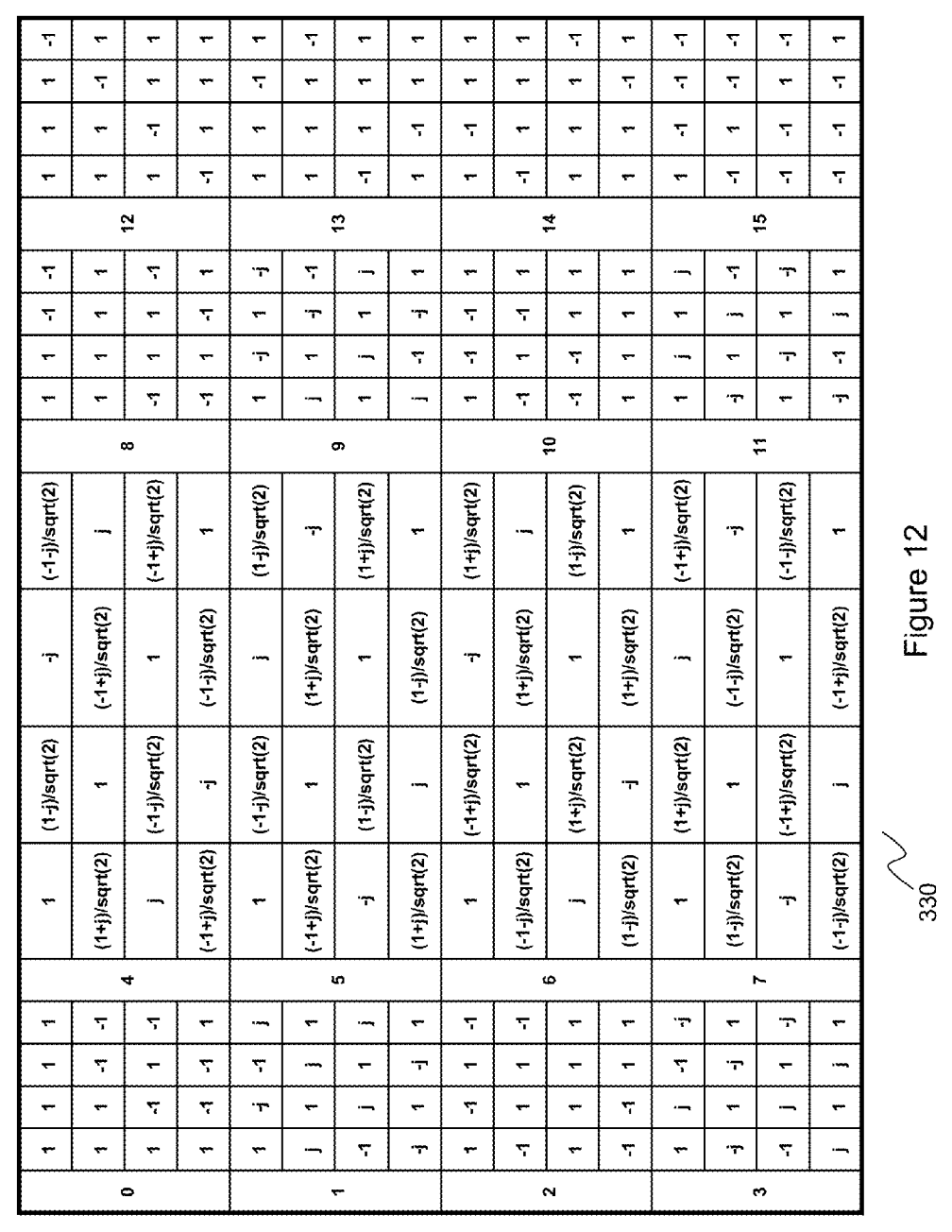

In conjunction with the codebooks of FIG. 11, FIG. 12 illustrates table 330 showing antenna codebook matrices ($W_n$*2) for four antenna ports. For a single column cross-polarized AAS, generally there are two ways to designate the four virtual antennas to the codebook.

In the first case, antenna 0 and antenna 2 are used for the two virtual antennas on one polarization, and antenna 1 and antenna 3 are used for the two virtual antennas on the other polarization. In the second case, antenna 0 and antenna 1 are used for the two virtual antennas on one polarization, and antenna 2 and antenna 3 are used for the two virtual antennas on the other polarization.

By examining the codebook matrices, it can be seen that, for the first case, the supported vertical direction phase differences between two virtual antennas of the same polarization are 0, $\pm\pi/2$, and $\pi$. Therefore, the down tilt function supported in the first case is the same as the two antenna case previously discussed. For the second case, the supported vertical direction phase differences between two virtual antennas of the same polarization are 0, $\pm\pi/4$, $\pm\pi/2$, $\pm 3\pi/4$, and $\pi$. Therefore, the second case can support more down tilt angles. Either of the two cases may be selected depending on which one gives the better performance in a specific application environment. The above discussion also is applicable to a two column single polarization antenna.

Figure 13B:
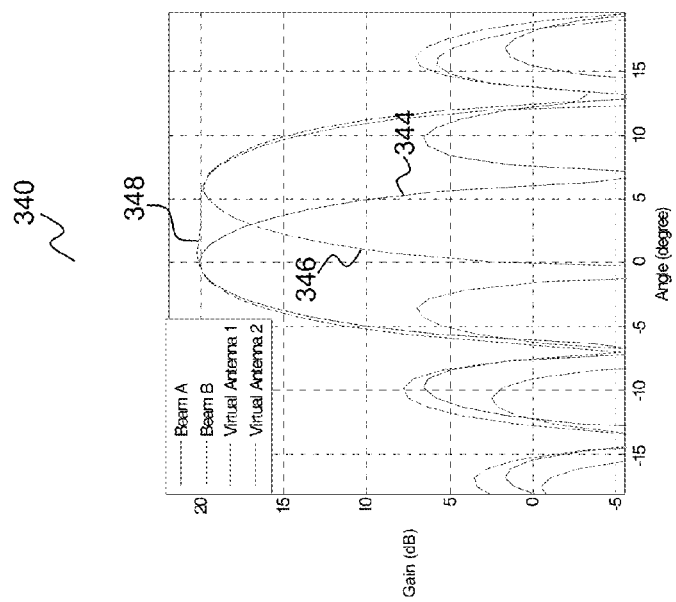
FIGS. 13A and 13B are graphs showing gain over elevation for another illustrative design of virtual antennas.
Figure 13A:
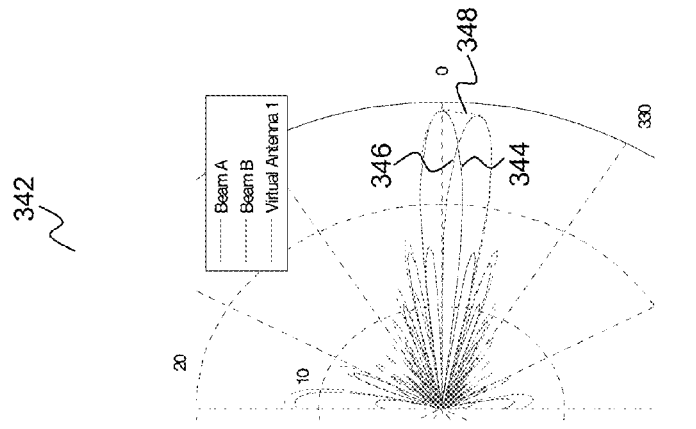

FIGS. 13A and 13B illustrate a Cartesian coordinate graph 340 and a polar graph 342, respectively, showing gain for an example four virtual antenna design. An antenna has a 10-element uniform array spaced by 0.85λ. Beam A 344 is down-tilted by 0°, and Beam B 346 is down-tilted by 6°. Both beams have a 3 dB bandwidth of about 6°.

The current distribution of Beam A 344 on the antenna elements is a constant D.

The current distribution of Beam B 346 on the antenna elements is given by:

D*exp(i*pi*sin(6°*(N−5.5)), where D is a constant, and N=1, 2, . . . ,10.

The virtual antenna 348 has a beam width of about 12°. Here again, this is only an example design. In accordance with embodiments of the invention, other variations of synthesis methods can be employed to achieve the desired phase characteristics for the virtual antenna beam.

Figure 14B:
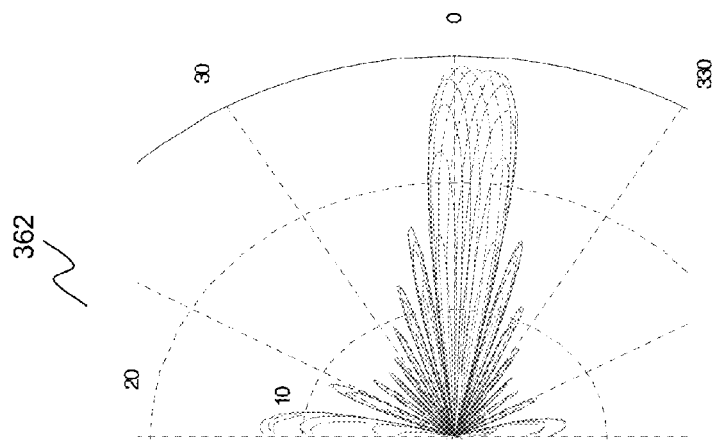
FIGS. 14A and 14B are graphs showing gain over elevation of a series of beams with different down tilt angles produced by the illustrative design using a four antenna code book.
Figure 14A:
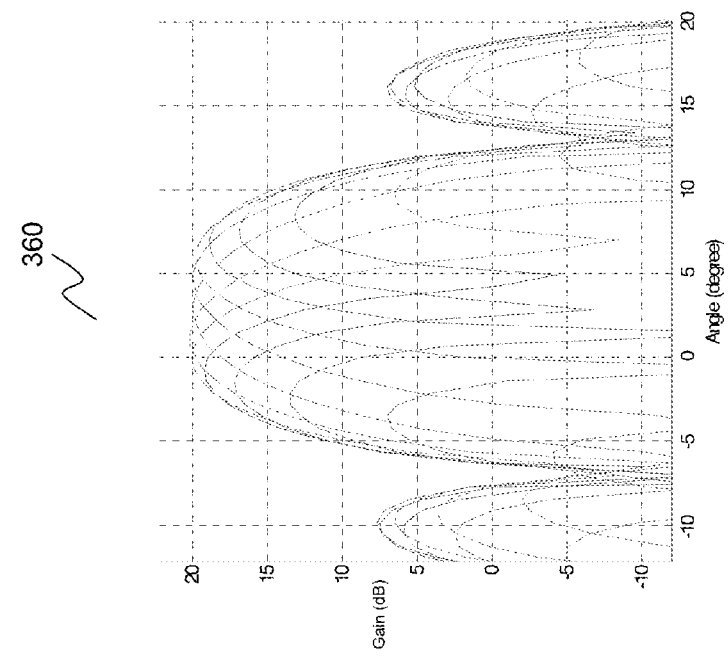

FIGS. 14A and 14B illustrate a Cartesian coordinate graph 360 and a polar graph 362, respectively, showing gain of a series of beams with different down tilt angles. Specifically, the graphs show the antenna pattern for the first case four antenna codebook application discussed above. The codebook vectors for the different beams are (1,1), (1, (1+i)/sqrt(2)), (1,i), (1,(−1+i)/sqrt(2)), (1, −1), (1, (−1−i)/sqrt(2)), (1, −i), and (1, (1−i)/sqrt(2)). As can be seen in the graphs, each of the codebook vectors produces a beam with unique down tilt angle.

As previously mentioned, a typical single column AAS has two cross-polarizations for diversity. By synthesizing two beams with different down-tilt angles for each cross-polarization, four Rx outputs can be generated to support a four Rx application on the uplink. MRC or IRC combining can be used in the receiver to effectively form receive beams that either point at the user with the proper down-tilt angle (in the case of MRC) or minimize the interference to the user (in the case of IRC).

Figure 15:
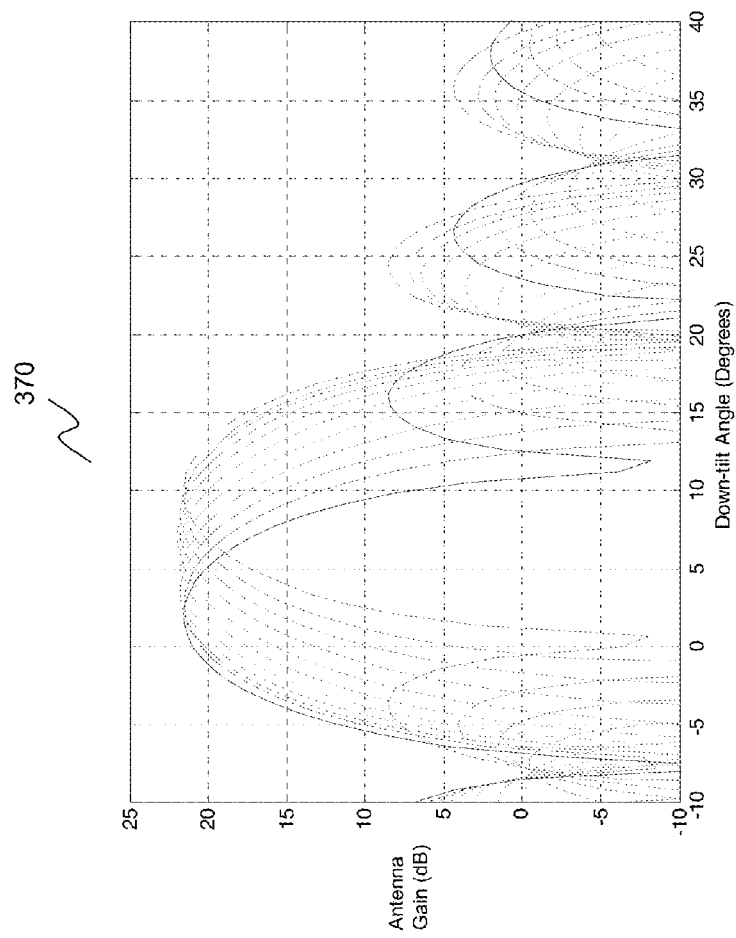
FIG. 15 is a graph showing gain over elevation of a series of beams with different down tilt angles that can be formed on the uplink.

As an example uplink design, FIG. 15 illustrates the gain of a series of beams with different down tilt angles. Using the same two beams as in the case of the downlink, one beam has 2° down-tilt and the other beam has 10° down-tilt. Using MRC, a series of beams with down-tilt aimed at the mobile can be synthesized, as shown in FIG. 15. By minimizing interference from other users and other cells, the uplink throughput should be significantly enhanced.

Although the present invention and its advantages have been described in detail, it should be understood that various changes, substitutions and alterations can be made herein without departing from the spirit and scope of the invention as defined by the appended claims. For example, many of the features and functions discussed above, such as the digital processing functions, can be implemented in software, hardware, firmware, or a combination thereof.

As another example, it will be readily understood by those skilled in the art that various beam parameters may be varied while remaining within the scope of the present invention. Beam A has a smaller down-tilt angle than Beam B, and could be designed with higher side-lobe suppression below the horizon. Beam B has a larger down-tilt angle than Beam A, and could be optimized by null filling to prevent Beam A from dominating at large down-tilt angles. Furthermore, the down-tilt angle difference between Beam A and Beam B can be fine tuned for specific applications.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for user-specific antenna down tilt, the method comprising:
   generating, with a first physical antenna, a first antenna beam A having a first down tilt angle;
   generating, with the first physical antenna, a second antenna beam B having a second down tilt angle different from the first down tilt angle;
   synthesizing a first virtual antenna from the first and second beams;
   synthesizing a second virtual antenna from the first and second beams;
   transmitting a first pilot signal via the first virtual antenna;
   transmitting a second pilot signal via the second virtual antenna;
   receiving, from a user equipment (UE), information indicative of a phase difference between the first and second virtual antennas;
   determining a multiple-input multiple output pre-coding vector according to the information received from the UE; and
   transmitting user data modulated by the pre-coding vector to the UE via the first and second virtual antennas.

2. The method of claim 1, wherein the first virtual antenna is synthesized from beam A and beam B according to A+i*B, and the second virtual antenna is synthesized from beam A and beam B according to A−i*B.

3. The method of claim 1, wherein the information indicative of the phase difference between the first and second virtual antennas is a pre-coding control indicator.

4. The method of claim 1, wherein the pre-coding vector is selected from the group consisting of: (1, 1), (1, i), and (1, −1).

5. The method of claim 1, wherein a current distribution of beam A or B on the antenna elements is)D*exp(i*pi*sin(x°) *(N−(M+1)/2)), where D is a constant, x is a down-tilt angle of beam A or B, M is a number of antenna elements in the physical antenna, and N=1, 2, . . . , M.

6. The method of claim 1, wherein the first physical antenna has more than two antenna elements, and wherein the first and second virtual antennas are the only synthesized virtual antennas.

7. The method of claim 4, wherein user data beam patterns corresponding to the group of pre-coding vectors are 2A for (1, 1), (1+i)*(A+B) for (1, i), and 2i*B for (1, −1).

8. A method for user-specific antenna down tilt, the method comprising:
synthesizing a plurality of virtual antennas from a single physical antenna, wherein a total number of virtual antennas is less than a total number of antenna elements in the physical antenna;
transmitting pilot signals on the plurality of virtual antennas, wherein at least two pilot signals comprise antenna beams with different down tilt angles;
receiving, from a user equipment (UE), a pre-coding control indicator according to the transmitted pilot signals;
determining a multiple-input multiple output pre-coding vector according to the pre-coding control indicator; and
transmitting user data modulated by the pre-coding vector to the UE via the plurality of virtual antennas.

9. The method of claim 8, wherein the total number of virtual antennas is two.

10. The method of claim 8, wherein the antenna elements in the physical antenna are in a single column and have cross-polarization or are in two columns each with a single polarization, and wherein the total number of virtual antennas is four.

11. The method of claim 10, wherein the pre-coding control indicator indicates a phase difference between two of the virtual antennas, the phase difference selected from the group consisting of: 0, ±π/2, and π.

12. The method of claim 10, wherein the pre-coding control indicator indicates a phase difference between two of the virtual antennas, the phase difference selected from the group consisting of: 0, ±π/4, ±π/2, ±3π/4, and π.

13. The method of claim 10, wherein the pre-coding vector is selected from the following table:

| | | | | |
|---|---|---|---|---|
| 0 | 1 | 1 | 1 | 1 |
| | 1 | 1 | −1 | −1 |
| | 1 | −1 | 1 | −1 |
| | 1 | −1 | −1 | 1 |
| 1 | 1 | −j | −1 | j |
| | j | 1 | j | 1 |
| | −1 | j | 1 | j |
| | −j | 1 | −j | 1 |
| 2 | 1 | −1 | 1 | −1 |
| | −1 | 1 | 1 | −1 |
| | 1 | 1 | 1 | 1 |
| | −1 | −1 | 1 | 1 |
| 3 | 1 | j | −1 | −j |
| | −j | 1 | −j | 1 |
| | −1 | j | 1 | −j |
| | j | 1 | j | 1 |
| 4 | 1 | (1 − j)/sqrt(2) | −j | (−1 − j)/sqrt(2) |
| | (1 + j)/sqrt(2) | 1 | (−1 − j)/sqrt(2) | j |
| | j | (−1 − j)/sqrt(2) | 1 | (−1 + j)/sqrt(2) |
| | (−1 + j)/sqrt(2) | −j | (−1 − j)/sqrt(2) | 1 |
| 5 | 1 | (−1 − j)/sqrt(2) | j | (1 − j)/sqrt(2) |
| | (−1 + j)/sqrt(2) | 1 | (1 + j)/sqrt(2) | −j |
| | −j | (1 − j)/sqrt(2) | 1 | (1 + j)/sqrt(2) |
| | (1 + j)/sqrt(2) | j | (1 − j)/sqrt(2) | 1 |
| 6 | 1 | (−1 + j)/sqrt(2) | −j | (1 + j)/sqrt(2) |
| | (−1 − j)/sqrt(2) | 1 | (1 + j)/sqrt(2) | j |
| | j | (1 + j)/sqrt(2) | 1 | (1 − j)/sqrt(2) |
| | (1 − j)/sqrt(2) | −j | (1 + j)/sqrt(2) | 1 |
| 7 | 1 | (1 + j)/sqrt(2) | j | (−1 + j)/sqrt(2) |
| | (1 − j)/sqrt(2) | 1 | (−1 − j)/sqrt(2) | −j |
| | −j | (−1 − j)/sqrt(2) | 1 | (−1 − j)/sqrt(2) |
| | (−1 − j)/sqrt(2) | j | (−1 + j)/sqrt(2) | 1 |
| 8 | 1 | 1 | −1 | −1 |
| | 1 | 1 | 1 | 1 |
| | −1 | 1 | 1 | −1 |
| | −1 | 1 | −1 | 1 |
| 9 | 1 | −j | 1 | −j |
| | j | 1 | −j | −1 |
| | 1 | j | 1 | j |
| | j | −1 | −j | 1 |
| 10 | 1 | −1 | −1 | 1 |
| | −1 | 1 | −1 | 1 |
| | −1 | −1 | 1 | 1 |
| | 1 | 1 | 1 | 1 |
| 11 | 1 | j | 1 | j |
| | −j | 1 | j | −1 |
| | 1 | −j | 1 | −j |
| | −j | −1 | j | 1 |
| 12 | 1 | 1 | 1 | −1 |
| | 1 | 1 | −1 | 1 |
| | 1 | −1 | 1 | 1 |
| | −1 | 1 | 1 | 1 |
| 13 | 1 | 1 | −1 | 1 |
| | 1 | 1 | 1 | −1 |
| | −1 | 1 | 1 | 1 |
| | 1 | −1 | 1 | 1 |
| 14 | 1 | −1 | 1 | 1 |
| | −1 | 1 | 1 | 1 |
| | 1 | 1 | 1 | −1 |
| | 1 | 1 | −1 | 1 |
| 15 | 1 | −1 | −1 | −1 |
| | −1 | 1 | −1 | −1 |
| | −1 | −1 | 1 | −1 |
| | −1 | −1 | −1 | 1. |

14. The method of claim 10, further comprising:
generating four receive outputs for an uplink from the UE;
using maximum ratio combining to form receive beams pointing at the UE with a desired down-tilt angle; and
receiving user data from the UE.

15. The method of claim 10, further comprising:
generating four receive outputs for an uplink from the UE;
using interference rejection combining to minimize interference to the UE; and
receiving user data from the UE.

16. An active antenna system comprising:
a physical antenna having a vertical column of more than two antenna elements and configured to radiate pilot signals from first and second virtual antennas, wherein at least two pilot signals comprise antenna beams with different down tilt angles;
a wideband radio unit comprising at least two transmission and reception units coupled to the physical antenna; and
a baseband unit coupled to the wideband radio unit, the baseband unit configured to synthesize the first and second virtual antennas, receive an indication of a phase difference between the first and second virtual antennas specific to a user equipment (UE), determine a multiple-input multiple output pre-coding vector according to the phase difference; and modulate user data with the pre-coding vector for transmission to the UE via the first and second virtual antennas.

17. The active antenna system of claim 16, wherein there is a one-to-one correspondence between the antenna elements and the transmission and reception units.

18. The active antenna system of claim 16, wherein the baseband unit comprises:
  a beam forming unit couple to the wideband radio unit; and
  a signal processor couple to the beam forming unit, wherein digital beam forming is performed in the baseband unit.

19. The active antenna system of claim 16, further comprising a feeder distribution network disposed between the antenna and the wideband radio unit.

20. The active antenna system of claim 19, wherein analog beam forming is performed in wideband radio unit and feeder distribution network.

21. An antenna system comprising:
  a physical antenna having a vertical column of more than two antenna elements and configured to radiate pilot signals from first and second virtual antennas;
  a wideband radio unit having two transmission and reception units coupled to the antenna;
  a feeder distribution network disposed between the wideband radio unit and the physical antenna, and coupling each of the transmission and reception units to the antenna elements, the feeder distribution network configured to synthesize the first and second virtual antennas; and
  a baseband unit coupled to the wideband radio unit, and configured to receive an indication of a phase difference between the first and second virtual antennas specific to a user equipment (UE), determine a multiple-input multiple output pre-coding vector according to the phase difference; and modulate user data with the pre-coding vector for transmission to the UE via the first and second virtual antennas,
  wherein the first virtual antenna is synthesized from a beam A associated with a first one of the transmission and reception units, and the second virtual antenna is synthesized from a beam B associated with a second one of the transmission and reception units, and
  wherein the beam A and the beam B comprise different down tilt angles.

22. The antenna system of claim 21, wherein the first virtual antenna is synthesized according to $A+i*B$, and the second virtual antenna is synthesized according to $A-i*B$.

* * * * *

UNITED STATES PATENT AND TRADEMARK OFFICE
CERTIFICATE OF CORRECTION

PATENT NO. : 8,891,647 B2
APPLICATION NO. : 12/915525
DATED : November 18, 2014
INVENTOR(S) : Zhengxiang Ma It is certified that error appears in the above-identified patent and that said Letters Patent is hereby corrected as shown below:

In the Claims

In Col. 10, line 41, claim 1, delete "with a first physical" and insert --with a physical--.
In Col. 11, line 4, claim 5, delete "elements is)" and insert --elements is--.
In Col. 11, line 8, claim 6, delete "the first physical" and insert --the physical--.

Signed and Sealed this
Tenth Day of March, 2015

Michelle K. Lee
*Deputy Director of the United States Patent and Trademark Office*